United States Patent [19]

Endo et al.

[11] Patent Number: 5,691,485
[45] Date of Patent: Nov. 25, 1997

[54] COAXIAL DOUBLE TUBE TYPE CORIOLIS FLOWMETER

[75] Inventors: Takashi Endo; Kenichi Matsuoka; Kimihiro Ichinose; Hidemi Seki; Shingo Gomi, all of Tokyo, Japan

[73] Assignee: Oval Corporation, Tokyo, Japan

[21] Appl. No.: 462,734

[22] Filed: Jun. 5, 1995

[30] Foreign Application Priority Data

| Jun. 6, 1994 | [JP] | Japan | 6-123549 |
| Feb. 15, 1995 | [JP] | Japan | 7-026644 |
| May 2, 1995 | [JP] | Japan | 7-108823 |

[51] Int. Cl.$^6$ .................................................. G01F 1/84
[52] U.S. Cl. .................................................. 73/861.357
[58] Field of Search ............... 73/861.354, 861.355, 73/861.356, 861.357, 32 A

[56] References Cited

U.S. PATENT DOCUMENTS

| 4,793,191 | 12/1988 | Flecken et al. | 73/861.357 |
| 4,962,671 | 10/1990 | Stansfeld et al. | 73/861.357 |
| 5,048,349 | 9/1991 | Wolff | 73/861.357 |
| 5,351,561 | 10/1994 | Wenger et al. | 73/861.357 |
| 5,365,794 | 11/1994 | Hussain et al. | 73/861.357 |
| 5,373,745 | 12/1994 | Cage | 73/861.357 |
| 5,398,554 | 3/1995 | Ogawa et al. | 73/861.357 |

FOREIGN PATENT DOCUMENTS

| 0317340 | 5/1989 | European Pat. Off. . |
| 0473919 | 3/1992 | European Pat. Off. . |
| 0598287 | 5/1994 | European Pat. Off. . |
| 2215607 | 8/1974 | France . |
| 4143361A1 | 3/1993 | Germany . |

OTHER PUBLICATIONS

Measurements, vol. 11, No. 4, Jul. 1993 London GB, pp. 289-308, XP 003387399 G. Adiletta et al. "A twin rigid straight pipe Coriolis mass flowmeter" p. 290, paragraph 5–p. 291, last paragraph; FIG. 1.

*Primary Examiner*—Elizabeth L. Dougherty
*Assistant Examiner*—Harshad Patel
*Attorney, Agent, or Firm*—Jordan and Hamburg

[57] ABSTRACT

Disclosed is a Coriolis flowmeter which is capable of detecting a mass flow and a density of fluid with an increased stability by resonantly oscillating a double tube portion consisting of an inner flow tube allowing fluid to flow therein and a coaxially disposed thereon counterbalance tube provided with a weight for equalizing the lateral natural frequency of the counterbalance tube with that of the flow tube. The Coriolis flowmeter has supporting metal means for supporting the both ends of the flow tube in such a way that the both ends of the flow tube is restricted in radial directions and axially movable in respective connecting flange; the inner flow tube has extending ends enlarged in diameter and supported in the respective connecting flanges of the outer housing. The flow tube is further supported at near-to-end portions on respective rectangle leaf springs having a plane parallel to oscillating direction and extending in radial direction of the double tube portion being perpendicular to the oscillating direction within the outer housing. The flow tube is thus supported at four stable points representing oscillating nodes, axially movable but radially restricted, assuring stable oscillation and accurate measurement of mass flow.

22 Claims, 11 Drawing Sheets

COAXIAL DOUBLE TUBE TYPE CORIOLIS FLOWMETER

BACKGROUND OF THE INVENTION

The present invention relates to a Coriolis flowmeter and, more particularly, to a double tube type or counterbalanced type Coriolis flowmeter.

As is well known, a Coriolis flowmeter is based on the principle that, when fluid of mass flow "m" flows in a flow tube which is supported at both ends on supporting means and is driven with alternate oscillation at angle velocity "ω" about the supporting points, the flow tube is subjected to the action of a Coriolis force F, which is proportional to a vector product of the mass flow "m" and the angle velocity "ω", and the mass flow "m" can be determined from the Coriolis force F measured. Namely, the flow tube is deformed by the Coriolis force F, producing a phase difference proportional to the Coriolis force F by measuring which the mass flow "m" can be determined. Furthermore, when the angle velocity "ω" is selected so as to be equal to a natural frequency "$\omega_o$" of oscillation of the flow tube about its supporting points, the density "ρ" of the fluid can also be determined from the natural frequency "$\omega_o$". The flow tube, which is an essential portion of the Coriolis flowmeter for measuring a Coriolis force F and a density "ρ" of fluid, may be either of a straight tube and curved tube.

The curved flow tube of a Coriolis flowmeter has a shape being symmetric about an axis orthogonal to an axis of the supporting members supporting the both ends of the flow tube. When the curved flow tube is driven in direction perpendicular to its base plane, a Coriolis force F is detected as a phase difference of oscillations produced at two symmetrically opposite positions about the symmetric axis. At a constant driving frequency, the phase difference is measured for example as a time difference ΔT of moments when both arms of the curved flow tube pass a reference plane at which the curved flow tube exists in the still state (no oscillation). This method is featured by that a phase difference can be detected at a higher sensitivity by increasing a torsional moment of the curved tube at the phase difference detecting portions. However, increasing torsional moment results in increasing the size of the curved tube, that requires an increased installation space.

On the other hand, a straight flow tube has the most simple form which may reduce the size of the Coriolis flowmeter. Particularly, a single straight tube type Coriolis flowmeter can offer this advantage. However, a multi-tube type Coriolis flowmeter has a plurality of parallel tubes and has a correspondingly increased size of the arrangement, requiring the provision of a branching portion for evenly distributing all flow tubes. This branching portion is a bent tube which is difficult to be maintained, in particular, for cleaning.

The straight tube type (in particular, a single straight tube type) Coriolis flowmeter posses the above-mentioned feature but, on the other hand, has a large rigidity and small sensitivity of the straight tube for responding to a Coriolis force, i.e., a poor S.N (signal to noise) ratio. The most simple way for increasing the S.N ratio of the straight flow tube is to make the flow tube have a thinner wall or a larger length. However, thinned flow tube can be easily affected by the pressure of fluid and the elongated flow tube may be easily influenced by an external vibration because of its lowered natural frequency and, furthermore, may introduce an error in measurement of mass flow (m) because of a change of its natural frequency ($\omega_o$) by the effect of thermal expansion.

Japanese Laid-Open Patent Publication No. 63-158419 discloses a straight-tube type Coriolis flowmeter wherein at least one measuring tube is mounted within a supporting cylinder and supported at both ends therein by means of ring diaphragms. A flow tube having both fixed ends may be subjected to mechanical stress produced therein due to thermal deformation, thereby its natural frequency changes, resulting in transmission of oscillating energy of the flow tube to the supporting cylinder and a connecting tube. The application of the ring diaphragms aims to solve the above-mentioned problem by utilizing its elasticity.

This method may remove a noise due to measuring conditions if the straight tube remains to be the same size and form, but it involves such a problem that the ring diaphragms directly supporting the measuring tube ends may be fatigued for a long period of use, resulting in the decreased reliability of its operation. Furthermore, it is well known that the flow tubing has radically enlarged section at the ring diaphragms, whereat fluid cavitation arises with noisy vibration, resulting in seriously decreasing the stability of the measurement. To sense the Coriolis force at high sensitivity, the conventional straight-tube type flowmeter must have an elongated flow tube to decrease the rigidity or requires increasing a flowrate of fluid. If an elongated flow tube is applied, it may have a lower natural frequency and be easily affected by the external vibration. Increasing the fluid flowrate results in increasing the pressure loss in the flow tube and, at the same time, increasing the tubing stress.

To solve the above-mentioned problems, the present applicant previously proposed a Coriolis flowmeter which comprises a cylindrical outer housing having coaxially attached flanges at both ends and an integrally constructed double tube disposed coaxially within the cylindrical housing in such a way as to be axially movable but radially restricted.

An outer tube of the double tube portion is a counterbalancing tube which is adjustable with a weight to have the same natural frequency as that of the inner flow tube in the direction perpendicular to the axis of the inner flow tube, and is secured at both ends together with the flow tube in the respective cylindrical connecting blocks which are supported at peripheral surface with an O-ring in a wall of the external housing. Thermal expansion of the flow tube in its axial direction with heat of fluid flowing therethrough can be released through the O-rings made of elastic material at the double tube supporting positions. The flow tube, therefore, is free from the affection of its internal stress. However, the O-rings which is in contact with the fluid can be easily affected by the fluid temperature and pressure and may thereby change its supporting positions.

There is a parallel tube type Coriolis flowmeter wherein a counterbalancing tube is disposed not coaxially but parallel to a flow tube. The counterbalance tube is apart from the flow tube, thereby its temperature does not immediately change with a temperature change of the flow tube and a stress produced in the flow tube may have influence on oscillation of the counterbalance tube.

SUMMARY OF THE INVENTION

A primary object of the present invention is to provide a Coriolis flowmeter which is capable of measuring a mass flow and a density of fluid flowing in a flow tube coaxially disposed in an outer counterbalance tube, which is adjusted with an adjustable weight to have a same lateral natural frequency that the inner flow tube, by resonantly oscillating these two tubes, characterized in that said double tube portion is further supported at both ends on respective supporting means which are axially movable but radially restricted in the connecting flanges of the outer housing, thereby assuring a high stability of oscillation and a high sensitivity of measuring Coriolis force without any affection by fluid temperature and pressure.

Another object of the present invention is to provide a Coriolis flowmeter which is free from the affection of the temperature and pressure of fluid by providing that both ends of an inner flow tube extending from the double tube portion are connected with respective flexible tubes which are supported at their other ends in the wall of an outer housing for stabilizing supporting points for oscillation of the double tube portion.

Another object of the present invention is to provide a Coriolis flowmeter wherein inner flow tube of the double tube portion extends its both ends, each of which is connected with a flexible tube being supported at its other end, and, furthermore, the double tube portion is also supported at its near-to-end portions by rectangle leaf springs each having a plane parallel to oscillating direction and extending in radial direction of the double tube portion, said direction being perpendicular to the oscillating direction, thereby the both ends of the double tube portion are movable in axial direction and rigidly supported in oscillation direction so that two tubes of the double tube portion can be resonantly oscillated.

Another object of the present invention is to provide a Coriolis flowmeter wherein inner flow tube of the double tube portion extends its both ends, each of which has an expanding opening and elastically supported in a connecting flange of the outer housing, thereby both ends of the double tube portion are movable in axial direction and rigidly supported in oscillation direction, assuring the stable measurement of mass flow.

Another object of the present invention is to provide a Coriolis flowmeter wherein inner flow tube of the double tube portion extends its both ends, each of which has an expanding opening (i.e., bell-mouthed end) and elastically supported in a connecting flange of the outer housing and, furthermore, the double tube portion is also supported at near-to-end portions by rectangle leaf springs each having a plane parallel to oscillating directions and extending in radial directions of the double tube portion, i.e., in direction perpendicular to the oscillating direction, thereby the both ends of the double tube portion are supported at four oscillation nodes with both ends movable in axial directions to eliminate movements of these ends in oscillating directions, assuring stable oscillation and high sensitivity of mass flow measurements without affection by the thermal expansion of the double tube.

Another object of the present invention is to provide a Coriolis flowmeter which is capable of measuring mass flow of fluid at variety of its density by adjusting the quantity of weights attachable to the counterbalance.

Another object of the present invention is to provide a straight tube type Coriolis flowmeter which is capable of stably measuring mass flow without affection of external disturbance through simple harmonic oscillation of a flow tube by providing a thin flat brace bar which can stably support the flow tube and counterbalance tube.

Another object of the present invention is to provide a straight tube type Coriolis flowmeter which uses counterbalances made of constant elastic material or material having a low coefficient of linear expansion that is capable of keeping a constant Young's ratio and a constant length against a temperature change, preventing a change of the oscillation period and incasing its response to a change of fluid temperature, thereby assuring the possibility of compensating coupled oscillation period varying depending only on the temperature of the flow tube.

DESCRIPTION OF THE PREFERRED EMBODIMENTS

Figure 1:
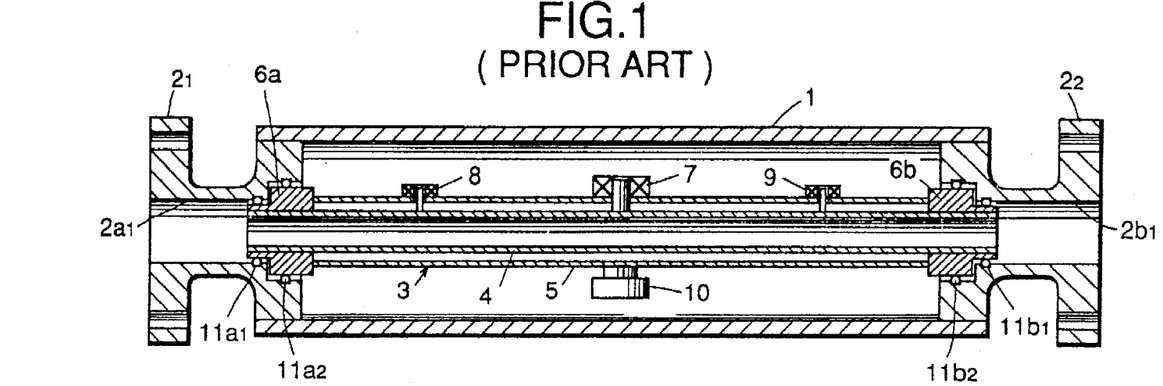
FIG. 1 is a sectional view of a conventional Coriolis flowmeter in a flow direction.

Coriolis flowmeters which have a single straight flow tube provided with a counterbalance to be driven together with a flow tube with the purpose of effectively detecting a Coriolis force and a density of fluid flowing in the flow tube with an increased sensitivity are classified mainly into a double straight tube type and a parallel straight tube type. A conventional double straight tube type Coriolis flowmeter and a conventional parallel straight tube type Coriolis flowmeter are described below:

FIG. 1 is a view showing a conventional double straight tube type Coriolis Flowmeter in section along the axis of its flow tube, which has a cylindrical outer housing 1 with connecting flanges $2_1$, $2_2$ at both ends and a double tube 3 coaxially disposed therein. The double tube 3 forms an essential part of the Coriolis flowmeter, which consists of an inner straight flow tube 4 allowing measurable fluid to flow therein and an outer straight tube (counterbalance) 5. Both tubes are coaxially secured at both ends in common connecting blocks 6a and 6b. The counterbalance tube 5 has, at its center portion, an adjustable weight 10 for adjusting a lateral natural frequency of the counterbalance tube 5 so that it may be equal to a lateral natural frequency of the flow tube 4 supported by the connecting blocks. A driving device 7 for driving the flow tube 4 and the counterbalance tube 5 with anti-phase resonance oscillations is disposed on the middle of the double tube portion. Paired sensors 8 and 9 are arranged symmetrically about the driving device 7 on the double-tube portion 3. These sensors 8 and 9 are used for detecting a phase difference of the flow tube 4, which is produced by the action of a Coriolis force.

The connecting blocks 6a, 6b of the double-tube portion 3 are liquid-tightly sealed at its outer walls with O-rings $11a_1$, $11a_2$, $11b_1$, $11b_2$ against inner walls $2a_1$, $2b_2$ of flanges $2_1$, $2_2$ of the outer housing 1 to prevent the fluid from leaking into the housing 1.

When a temperature difference occurs between the double-tube portion 3 and the outer housing 1 due to a large difference of fluid temperature from the ambient temperature, an inner stress is produced in the double-tube portion 3 because of a difference of thermal expansion therebetween. O-rings $11a_1$, $11a_2$, $11b_1$, $11b_2$ serve as elastic members for removing such inner stress of the double-tube portion 3 and, at the same time, they have an effect of shutting off the external vibration.

The double-tube portion 3 is elastically supported only by the O-rings $11a_1$, $11a_2$, $11b_1$, $11b_2$ which are made of synthetic rubber or other organic material and whose elasticity, therefore, may vary by the effect of fluid temperature. As the O-rings $11a_1$ and $11b_1$ are in direct contact with fluid flowing in the connecting flange, they may vary tightening force by the effect of the fluid pressure change, causing an influence on the resonance frequency.

Figure 2:
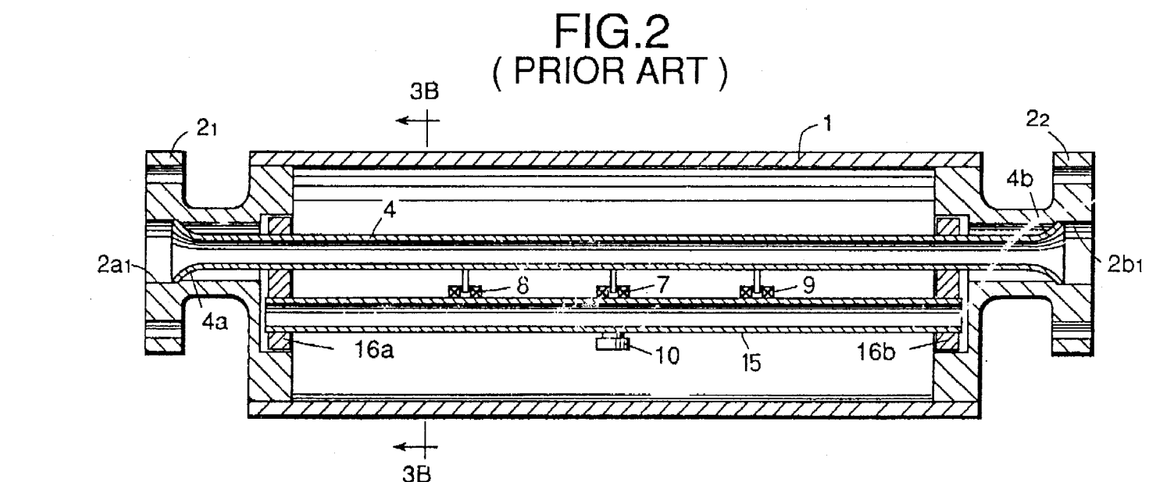
FIG. 2 is a sectional view of a conventional parallel straight-tube type Coriolis flowmeter in a flow direction.
Figure 3A:
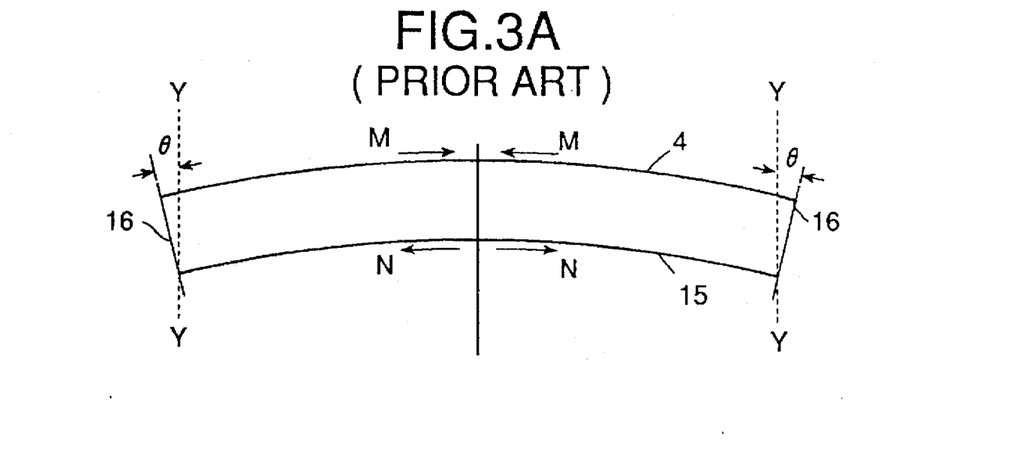
FIG. 3A shows a stress caused in a flow tube of the conventional Coriolis flowmeter shown in FIG. 2 when the flow tube is thermally deformed.
Figure 3B:
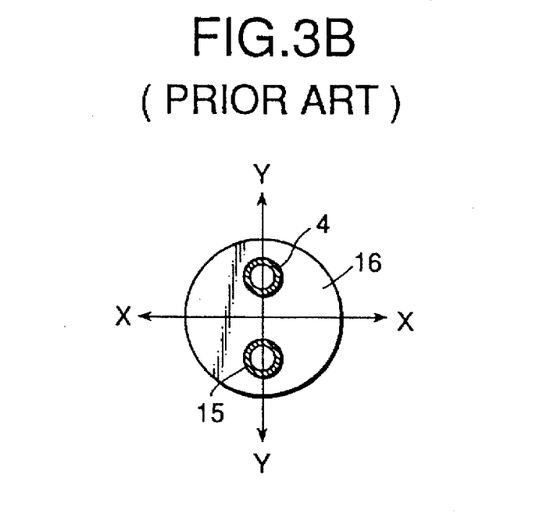
FIG. 3B shows an acting direction of a stress caused by thermal expansion of the parallel straight tube of the Coriolis flowmeter shown in FIG. 2.
Figure 3C:
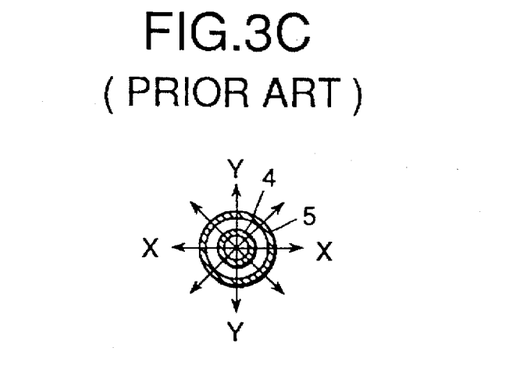
FIG. 3C shows an acting direction of a stress caused by thermal expansion of the double straight tube of the Coriolis flowmeter shown in FIG. 1.

FIG. 2 is a view showing a conventional parallel straight tube type Coriolis Flowmeter in section along the axis of its flow tube. In FIG. 2, a straight flow tube 4 has bell-mouthed ends 4a and 4b secured at periphery in connecting flanges $2_1$ and $2_2$ respectively. In parallel to the flow tube 4 is disposed a counterbalance 15, for example, of straight-tube type which is secured at both ends onto the flow tube body by means of connecting plates 16a and 16b. The counterbalance tube 15 has, at the center portion of its body, an adjusted weight 10 by which its natural frequency is adjusted to the natural frequency of the flow tube. Both tubes are driven with a resonance frequency by a driving device 7 and a phase difference proportional to a Coriolis force produced in the flow tube is detected by phase difference sensors 8 and 9. As soon as high-temperature fluid flows through the flow tube 4 during the flow measurement, the flow tube 4 is thermally equalized with the fluid and expands with heat. As shown in FIG. 3A, the flow tube 4 elongates but the counterbalance tube 15 does not expand. Therefore the connecting plates 16 tilts in opposite directions by angle θ from parallel lines Y—Y and the reaction force produces a compressive stress to the flow tube 4 in the direction shown by arrows M and a tensile stress to the counterbalance 15 in the direction N. The displacement causes the connecting plates 16 to tilt and produces bending stress in two tubes 4 and 15. Consequently, the resonance frequency changes, resulting in inducing an error in mass flow measurements. The double-tube type Coriolis flowmeter shown in FIG. 1 may be also subjected to the thermal stress due to the differential thermal expansion but differs from the case of the parallel tube type Coriolis flowmeter as follows:

FIGS. 3B and 3C are views for explaining acting directions of thermal stress of the parallel straight tube type Coriolis flowmeter shown in FIG. 2 and the double straight tube type Coriolis flowmeter shown in FIG. 1. FIG. 3B shows the acting direction of the stress produced by thermal expansion of the parallel straight tube in section and FIG. 3C shows the acting direction of the stress produced by thermal expansion of the double straight tube in section.

In the parallel straight tube type Coriolis flowmeter shown in FIG. 3B, points of thermal stress application are symmetric about Y-axis only. In the double straight tube type Coriolis flowmeter shown in FIG. 3C, points of the thermal stress application are symmetric about X-axis, Y-axis and other all axes, the compressive stress and the tensile stress are applied only in an axial direction of the tube and the thermal expansion in X-direction and Y-direction has no influence on the oscillation of the tube. Only the axial thermal expansion of the tube can have an influence on its oscillation.

Figure 4A:
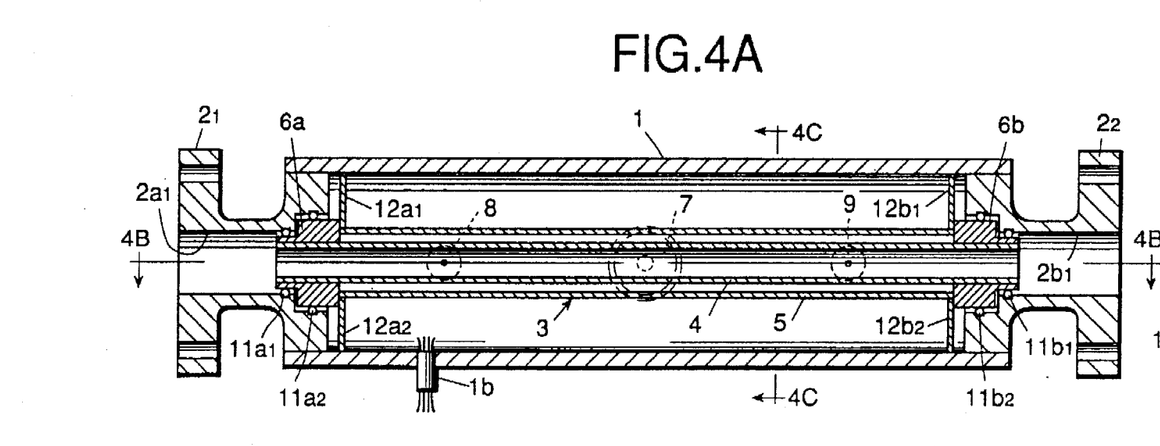
FIGS. 4A, 4B and 4C are views for explaining a Coriolis flowmeter embodying the present invention.
Figure 4B:
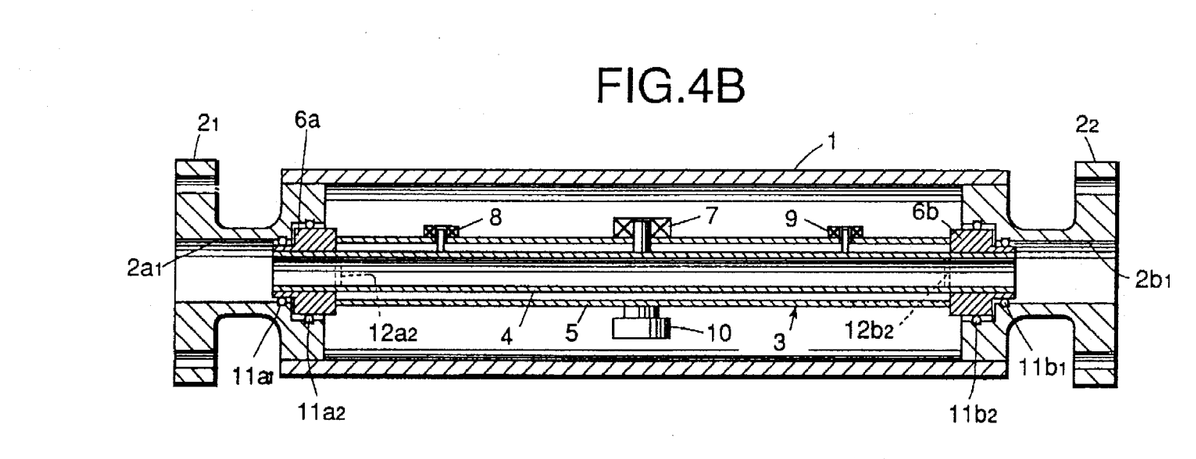
Figure 4C:
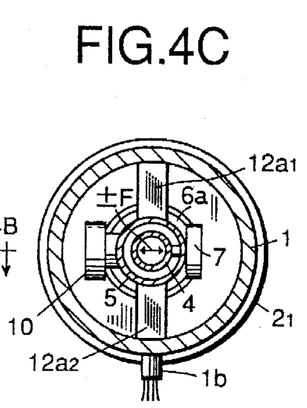

FIGS. 4A, 4B and 4C are views for explaining an embodiment 1 of a Coriolis flowmeter according to the present invention. FIG. 4B is a sectional view orthogonally turned view of FIG. 4A. A double straight tube 3, which is an essential portion of the Coriolis flowmeter, consists of an inner straight flow tube 4 and an outer straight counterbalance tube 5, both of which are coaxially supported and secured each at both ends in respective end-connecting blocks 6a and 6b. A weight 10 is disposed in the middle of counterbalance tube 5 in direction of oscillation and secured to the external wall thereof. The weight 10 is selected so as to equalize a natural frequency of the counterbalance tube 5 to a natural frequency of the flow tube 4 wherein measurable fluid flows.

Midst on and between the flow tube 4 and the counterbalance tube 5 is disposed a driving device 7 for anti-phasely oscillating the flow tube 4 and the counterbalance tube 5 with a resonant frequency. Furthermore, sensors 8 and 9 are disposed at opposite positions being symmetric about the driving device 7. These sensors detect displacements of the flow tube 4 relative to the counterbalance tube 5 to determine a phase difference proportional to a Coriolis force acting on the flow tube. Lead wires of the driving device 7, the sensors 8 and 9 are terminated at a terminal portion 1b for external connections.

The connecting blocks 6a and 6b of the double tube portion 3 are coaxially supported with O-rings made of elastic sealing material $11a_1$, $11a_2$ and $11b_1$, $11b_2$ respectively in respective end wall of the outer cylindrical housing 1. The double tube portion 3 is also supported elastically at the inside faces of the connecting blocks by leaf springs $12a_1$, $12a_2$ and $2b_1$, $12b_2$ respectively. Each leaf spring is a rectangular elastic plate having a plane parallel to oscillating direction along a line connecting the driving device 7 with weight 10 and extending in radial direction orthogonal to the oscillating direction. The flow tube 4 and the counterbalance tube 5, which compose the double tube portion 3, are anti-phasely oscillated in the direction shown by arrows (±F) at a resonance frequency by the driving device 7.

A Coriolis force proportional to a mass flow is determined as a value proportional to a phase difference signal, i.e., a difference of outputs of the sensors 8 and 9. A density of the measurable fluid can be also determined from the resonance frequency.

When the flow tube 4 and the counterbalance tube 5 of the double tube portion 3 are driven into resonant oscillation at a natural frequency, the connecting blocks 6a, 6b may slightly oscillate in axial directions according to a driving frequency amplitude. If the double tube portion 3 is supported by the leaf springs against the outer housing 1 in the same direction with the resonantly oscillating direction, the leaf springs may slightly oscillate in the axial direction of the flow tube 4 and, at the same time, may flexurally vibrate with a slight rotation about an axis perpendicular to the flow tube axis. Hence the gravity center of the double tube portion may slightly shift in the direction of its slight rotation.

On the contrary, leaf springs $12a_1$, $12a_2$, $12b_1$ and $12b_2$ shown in FIGS. 4A, 4B and 4C are supported against the housing 1 in a radial direction perpendicular to the oscillating direction. Hence they have a high rigidity in the oscillating direction but can easily move in the axial direction of the double tube portion 3. The leaf springs $12a_1$, $12a_2$, $12b_1$ and $12b_2$ may vibrate with a slight torsion only and do not move in the oscillating direction, assuring a stable support of the double tube portion 3.

The Coriolis flowmeter shown in FIGS. 4A, 4B and 4C is capable of sensing a phase difference signal proportional to a Coriolis force at a high sensitivity by virtue of using the double tube 3 with a weight 10 resonantly drivable with a natural frequency, by which the sensitivity of a straight flow tube is improved. This flowmeter is also capable of carrying out stable measurement of mass flow without affection by temperature and pressure of measurable fluid for a long duration of its use by virtue of elastically supporting the double tube portion 3 by rectangular leaf springs $12a_1$, $12a_2$ and $12b_1$, $12b_2$, each having a flat plane parallel to the driving direction and extending in the radial direction perpendicular to the driving direction, instead of O-rings $11a_1$, $11a_2$ and $11b_1$, $11b_2$ which, therefore, may serve as sealing members only for sealing passages $2a_1$, $2b_1$ and the internal chamber of the outer housing and aged change of thier elasticity has no effect of on the mass flow measurement.

Figure 5:
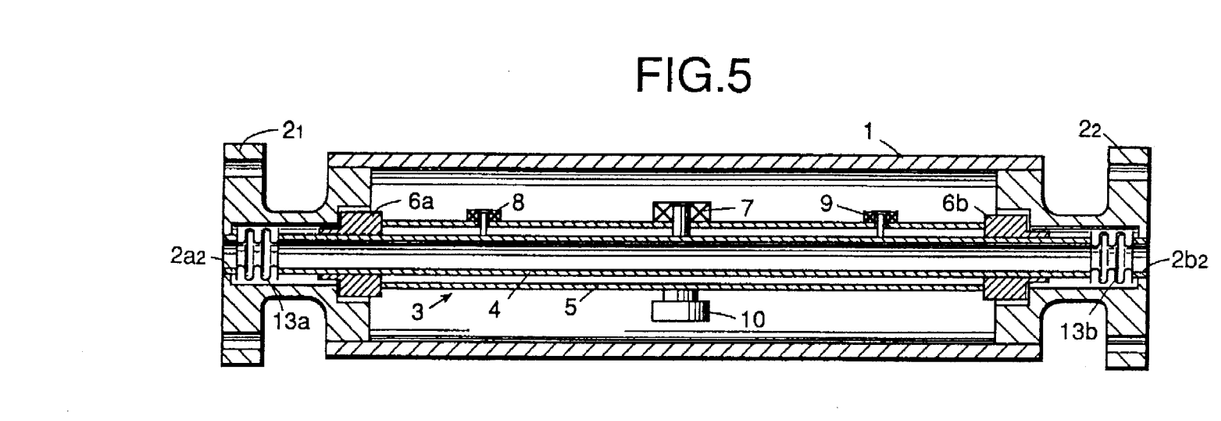
FIG. 5 illustrates another embodiment of a Coriolis flowmeter according to the present invention.

FIG. 5 is a view for explaining another embodiment 2 of a Coriolis flowmeter according to the present invention, which, like the embodiment 1, has a cylindrical outer housing 1 coaxially holding a double tube portion 3 therein. The double tube portion 3 consists of an inner flow tube 4 and an outer counterbalance tube 5, which are coaxially supported together at both ends in common connecting blocks 6a and 6b. The counterbalance tube 5 is provided on its center portion with a weight 10 for equalizing its natural frequency to a natural frequency of the flow natural frequency to a natural frequency of the flow tube 4. The double tube portion 3, therefore, can be resonantly driven with the specified natural frequency by a driving device 7 mounted thereon and a phase difference signal proportional to a Coriolis force acting thereon can be detected by sensors 8 and 9 attached thereto.

In the double tube portion, the flow tube 4, which is longer than the counterbalance tube 5, projects its ends toward connecting flanges $2_1$ and $2_2$ through the respective connecting blocks 6a and 6b. The projecting ends of the flow tube 4 are connected coaxially with respective flexible tubes 13a and 13b which are secured at the other ends to end portions $2a_2$ and $2b_2$ of respective flanges $2_1$ and $2_2$.

The flexible tubes 13a and 13b may be, for example, metal-made bellows having a thick wall, which can expand and contract in its axial direction but is hard to bend because of its higher rigidity than usual. The flexible tubes 13a and 13b can be made in the form of thick-walled metal bellows.

The above described embodiment 2 is a Coriolis flowmeter which, as the embodiment 1, can stably hold the double tube 3 and, therefore, can carry out stably measurements of a mass flow and a density of fluid without being affected by temperature and pressure of the fluid.

Figure 6A:
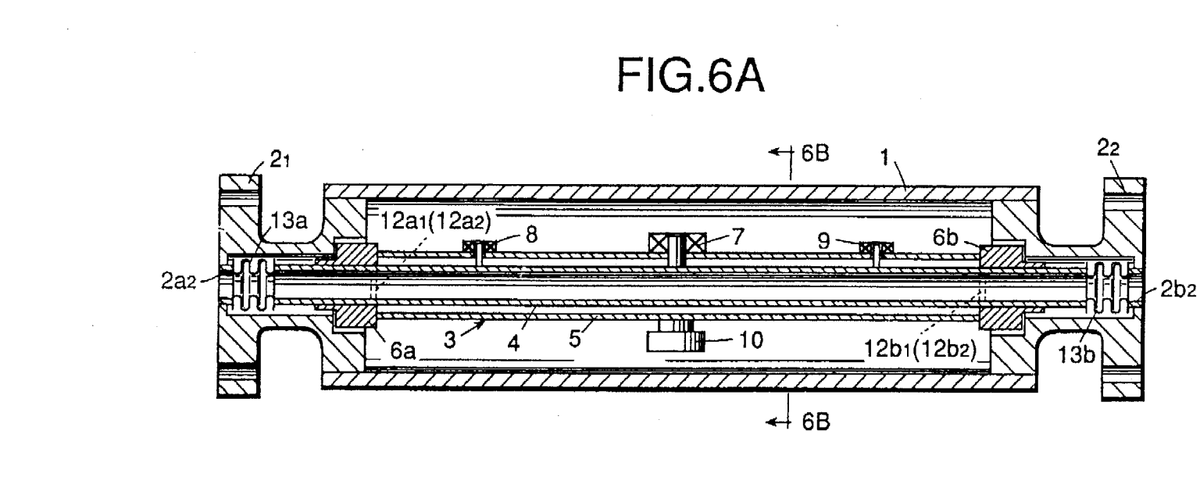
FIGS. 6A and 6B are illustrative of another embodiment of a Coriolis flowmeter according to the present invention.
Figure 6B:
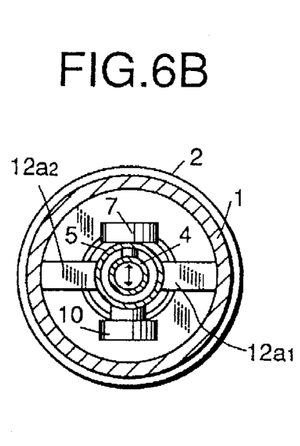

FIGS. 6A and 6B are views for explaining another embodiment 3 of a Coriolis flowmeter according to the present invention. A double tube portion 3 shown in FIGS. 6A and 6B is coaxially supported in a cylindrical outer housing 1 in such a way that its both ends may easily move in axial directions but restricted in radial directions.

The double tube portion 3 is provided with a weight 10, a driving device 7 and sensors 8 and 9.

The double tube portion 3, which is coaxially secured at both ends in respective connecting blocks 6a and 6b, is further supported by rectangle leaf springs $12a_1$, $12a_2$, $12b_1$, $12b_2$ against the inner wall of the outer housing. Each spring has a flat plane parallel to oscillating direction and extends in a radial direction perpendicular to the oscillating direction of the double tube portion 3. The flow tube 4 has projecting ends which are coaxially connected with respective flexible tubes (e.g., bellows) 13a and 13b which are secured at the other ends to end portions $2a_2$ and $2b_2$ of respective flanges 2.

The leaf springs $12a_1$, $12a_2$, $12b_1$, $12b_2$ are flat rectangular springs each of which is secured at one end to the inner wall of the outer housing 1 and at the other end with the connecting block 6a (or 6b) in such a way that its flat surface exists in parallel to the oscillating direction of the double tube portion and extends in a radial plane perpendicular to the oscillating direction. In the Coriolis flowmeter shown in FIGS. 8A and 6B, when the double tube portion 3 is driven by the driving device 7 with a resonant natural frequency, the leaf springs $12a_1$, $12a_2$, $12b_1$, $12b_2$ may have a slight torsional vibration and a slight axial vibration by the effect of the oscillation of the double tube portion but both vibrations can be absorbed by the flexible tubes 13a and 13b. As the leaf springs have a larger rigidity in the direction of the flat surface, they can surely eliminate the possibility of the oscillation of the double tube portion 3 with a displacement of its gravity center. Thermal expansion of metal may produce a relative displacement between the double tube portion 3 and the outer cylindrical housing 1 but such displacement is very small and can be easily absorbed without affecting the oscillating mode.

Figure 7A:
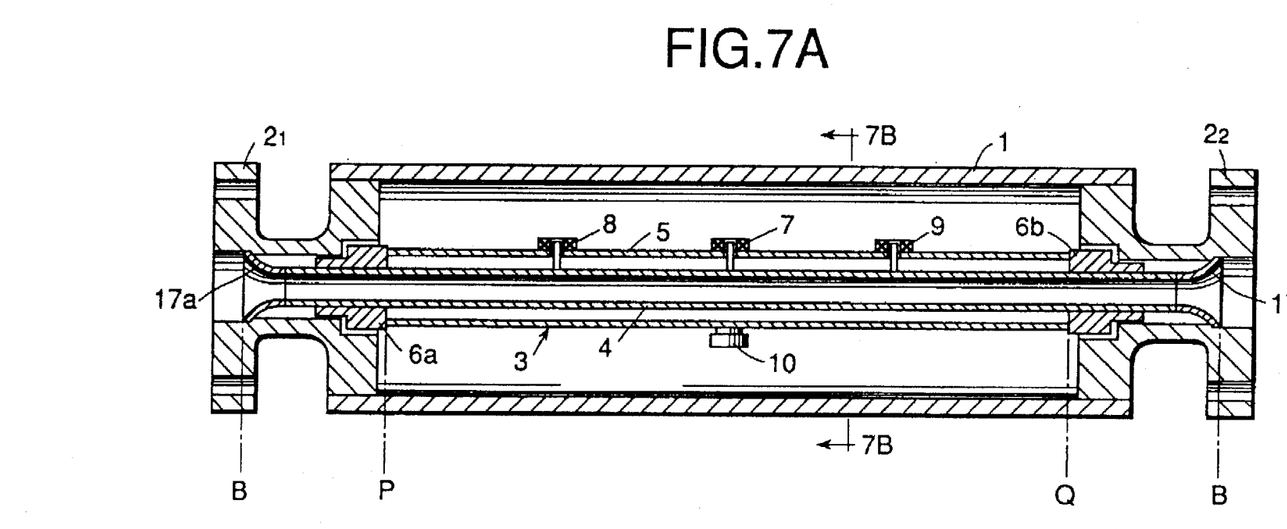
FIGS. 7A and 7B are illustrative of another embodiment of a Coriolis flowmeter according to the present invention.
Figure 7B:
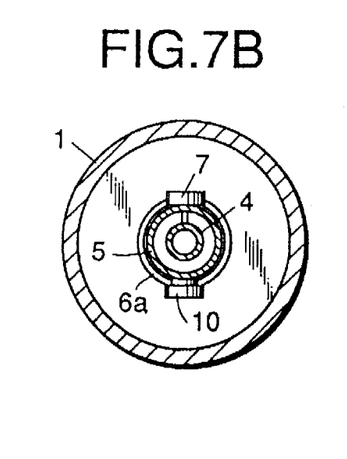

FIGS. 7A and 7B are views for explaining another embodiment 4 of a Coriolis flowmeter according to the present invention. A double tube portion 3 consists of an inner flow tube 4 and an outer counterbalance tube 5, which are coaxially supported each at both ends in common connecting blocks 6a and 6b. Both ends of the flow tube 4 through the connecting blocks 6a and 6b extend toward connecting flange $2_1$ and $2_2$ of the outer housing 1. Each projecting end of the flow tube 4 is connected with an equidiameter end of a tube 17a or 17b. The bell-mouthed end of this tube is secured to the inside passage wall of the flange $2_1$ and $2_2$. The bell-mouthed tubes may be made integrally with the flow tube 4.

As the bell-mouthed portions 17a and 17b have a high rigidity in the radial direction and can be elastically deformed with ease in the axial direction, the provision of bell-mouthed portions enables the flow tube 4 of the double tube portion 3 to be movable in its axial direction but is hard to radially displace. The double tube portion 3 can be resonantly driven with a low driving energy. The thus constructed Coriolis flowmeter assures a high sensitivity of mass flow measurements.

Figure 8A:
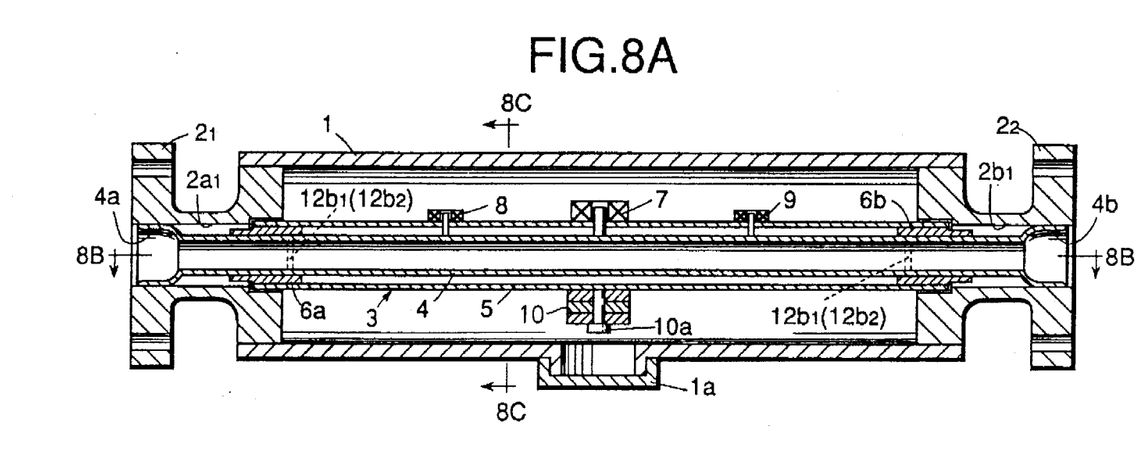
FIGS. 8A, 8B and 8C are views for explaining a Coriolis flowmeter embodying the present invention.
Figure 8B:
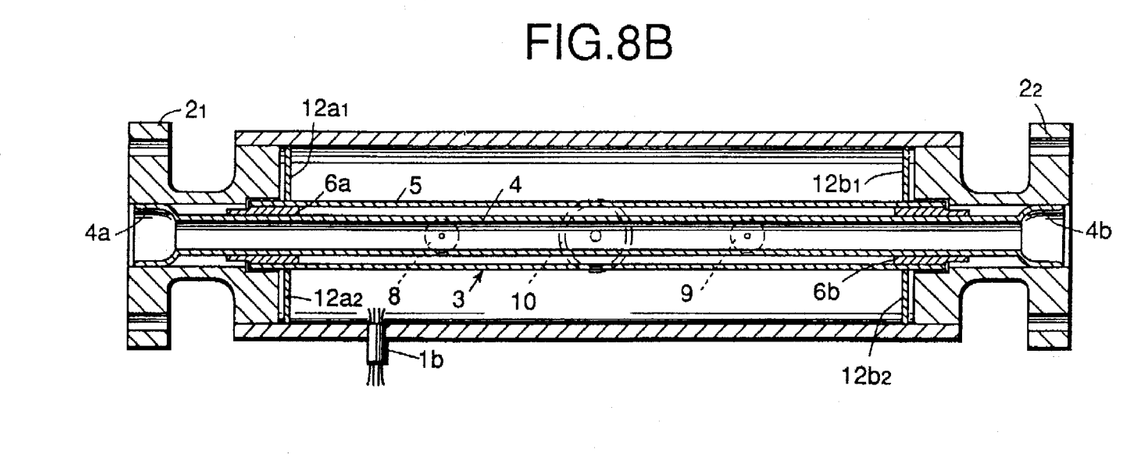
Figure 8C:
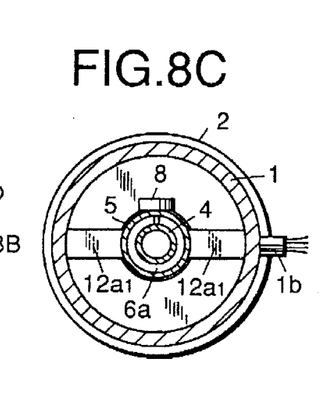

FIGS. 8A, 8B and 8C are views for explaining another embodiment 5 of a Coriolis flowmeter according to the present invention. A flow tube 4 is a straight tube wherein measurable fluid flows and which has, at its both ends, bell-mouthed portions 4a and 4b being axially extendable and contractable. Both bell-mouthed portions 4a and 4b are liquid-tightly secured at their periphery to the inside wall of respective flanges $2_1$ and $2_2$ of the outer housing 1.

The straight body portion of the flow tube 4 together with a coaxially disposed thereon outer counterbalance tube 5 constitutes a double tube potion 3 wherein the both tubes are supported coaxially at both ends in common respective cylindrical connecting blocks 6a and 6b. A driving device is mounted on the middle portion of the double tube portion 3, and sensors 7 and 8 for sensing a Coriolis force are arranged symmetrically about the driving device on the double tube portion 3. The counterbalance tube 5 is also provided with an externally weight 10 for adjusting a natural frequency of the counterbalance tube 5 secured with a bolt to a position diametrally reverse to the position where the driving device 7 is mounted. To assure the possibility of adjusting the weight from the outside, there is an access cover 1a in the outer housing 1.

Furthermore, leaf springs $12a_1$, $12a_2$, $12b_1$, $12b_2$, are secured each at one end face to the outside wall of the counterbalance tube 5 and at the other end face to the inside wall of the outer housing 1 in such a way that a flat surface of each spring may lie in a plane perpendicular to the axial line of the flow tube and radially orthogonal to a line passing centers of the driving device 7 (i.e., oscillating direction of the double tube portion 3).

In the Coriolis flowmeter shown in FIGS. 8A, 8B and 8C, the weight 10 is adjusted so as to make a natural frequency of the counterbalance tube 5 be equal to that of the flow tube about the connecting blocks 6a and 6b when measurable fluid flows through the flow tube 4, then the double tube portion 3 is driven at the adjusted resonance frequency by the driving device and a phase difference proportional to a Coriolis force is detected by the sensors 8 and 9.

At this time, a resonantly oscillating system consisting of the flow tube 4 and the counterbalance tube 5 is supported at middle portions, preferably at vibration nodes of both connecting blocks 6a and 6b by leaf springs $12a_1$, $12a_2$, $12b_1$, $12b_2$ against the inside wall of the outer housing 1 and the bell-mouthed ends 4a and 4b of the extending flow tube 4 of the double tube portion 3 are also supported each in respective connecting flanges of the outer housing 1. These 4 supporting points are serves as vibration nodes which do not transfer an oscillatory motion to portions out of the system. The system may stably oscillate.

Thermal expansion or stress of metal may cause a stress in the flow tube 4, which can be completely removed by the elastic deformation of the bell-mouthed ends 4a, 4b of the flow tube 4 and leaf springs $12a_1$, $12a_2$, $12b_1$ and $12b_2$ with no effect to the resonance frequency and the measurement results.

As be apparent from the foregoing, the Coriolis flowmeters (FIGS. 4A through 8C) according to the present invention are of double straight tube type which has a double tube portion 3 consisting of a flow tube 4 and a counterbalance tube 5, which are coaxially supported each at both ends in common connecting blocks 6a and 6b respectively, an adjustable weight 10 attached to the middle portion of the counterbalance tube 5 for adjusting a natural frequency of the counterbalance 5 to that of the flow tube 4, a driving portion 7 for driving the flow tube 4 and the counterbalance tube 5 at a resonant natural frequency and sensors 7 and 8 for sensing a phase difference proportional to a Coriolis force acting on the flow tube 4. In the coaxial double straight-tube type Coriolis flowmeter, a flow tube 4 of a high rigidity can be efficiently oscillated at a large amplitude frequency by using the resonance system, assuring an increased sensitivity of sensing a Coriolis force acting on the flow tube. Furthermore, the flow tube 4 are provided at both ends with O-rings made of elastic material $11a_1$, $11a_2$, $11b_1$, $11b_2$ or bellows 13a, 13b or bell-mouthed portions 17a (4a), 17b(4b) and is supported by leaf springs $12a_1$, $12a_2$, $12b_1$, $12b_2$ against the inside wall of the housing 1, with the result that the flow tube 4 may have a reduced rigidity in its axial direction enough to eliminate a possible influence of the metal expansion and contraction with heat from measurable fluid. Application of the flow tube thus constructed enables the Coriolis flowmeter to carry out stable measurements of mass flow of fluid without being thermally affected, eliminating the drawbacks of the Coriolis flowmeter having a straight flow tube secured at both ends.

On the other hand, Coriolis flowmeters are used for flow measurement of various kinds of fluids which have different physical and chemical properties. When a fluid having a temperature different from a room temperature flows, the flow tube 4 immediately responds and gets the same temperature as the fluid has whilst the counterbalance tube 5 may slowly change its temperature with a change of fluid temperature. For this reason, in a starting period, the flow tube 4 and the counterbalance tube 5 may change Young's module of their material with a change of the fluid temperature.

A natural frequency $f_1$ of the flow tube 4 and a natural frequency $f_2$ of the counterbalance tube 5 when measuring fluid flow rate are expressed as follows:

$$f_1 = \frac{1}{2\pi} \sqrt{\frac{K}{M_T + M_L}} \quad (1)$$

$$f_2 = \frac{1}{2\pi} \sqrt{\frac{K}{M_C + M_B}} \quad (2)$$

where K is a spring constant, $M_T$ is a mass of the flow tube 4, $M_L$ is a mass at a standard density of fluid, $M_B$ is a mass of the weight 10 and $M_C$ is a mass of the counterbalance tube 5.

The mass $M_B$ of the weight 10 is adjusted to a value whereat $f_1=f_2$ according to the equations (1) and (2).

Figure 13A:
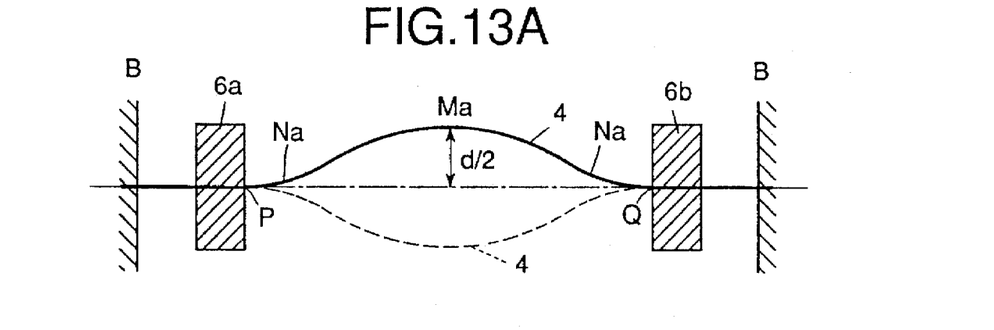
FIGS. 13A, 13B, 13C and 13D are views for explaining oscillation modes of a double tube type Coriolis flowmeter.

In the counterbalanced double-straight-tube type Coriolis flowmeter, for example, shown in FIGS. 7A and 7B (without using leaf springs $12a_1$, $12a_2$, $12b_2$, $12b_2$), a flow tube 4 and a counterbalance tube 5 are coaxially supported each at both ends in common connecting blocks 6a and 6b to form a double tube portion 3 wherefrom the flow tube 4 further projects both ends, each having bell-mouth 4a or 4b secured at periphery to the inside wall 2a or 2b of a connecting flange of the outer housing 1. The oscillating mode of the flow tube 4 is examined as follows:

As shown in FIG. 13A, the flow tube 4 in the double tube portion 3 laterally vibrates at an amplitude of d/2 shown by a solid line and broken line within the portion from P to Q. This oscillating mode has three curvatures Ma in center and Na at both end sides.

The Coriolis flowmeter shown in FIG. 7A is capable of effectively driving the flow tube 4 at a resonance frequency with a small driving energy, and the portion between points P and Q of the flow tube 4 has a small flexural rigidity and slightly vibrates. Hence stress caused in portions of the flow tube close to fixing positions B is small, assuring stable mass flow measurement. However, the connection blocks 6a and 6b of the double tube portion 3 are not supported on the inside wall of the outer housing 1 and, therefore, may easily move by the effect of an external disturbance, resulting in variation of zero position and dispersion of measurement results.

Figure 9A:
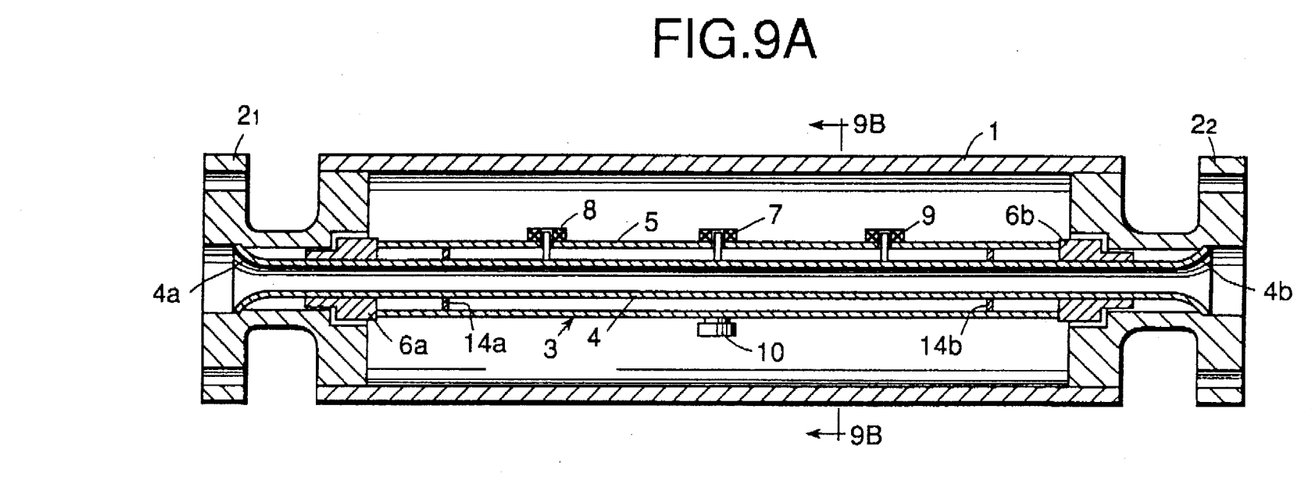
FIGS. 9A and 9B are illustrative of another embodiment of a Coriolis flowmeter according to the present invention.
Figure 9B:
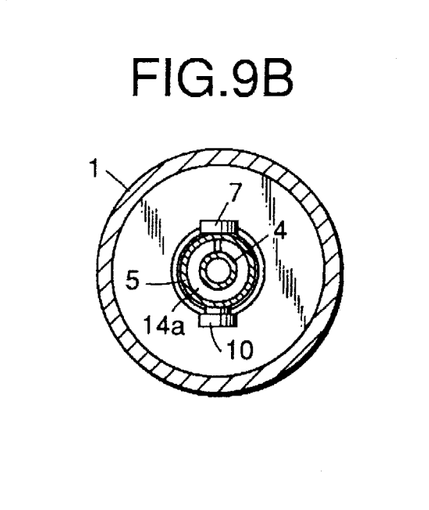

FIGS. 9A and 9B are views for explaining another embodiment 6 of a Coriolis flowmeter according to the present invention, wherein, similarly to the Coriolis flowmeter of FIG. 7A and 7B, has a flow tube 4 and a counterbalance tube 5 are coaxially supported each at both ends in common connection blocks 6a and 6b to form a double tube portion 3 wherefrom the flow tube 4 further projects its bell-mouthed ends which are secured at their periphery to inside wall of flanges $2_1$ and $2_2$ of an outer housing 1.

In FIGS. 9A and 9B, the flow tube 4 and the counterbalance tube 5 coaxially supported at both ends in the connection block 6a and 6b are also supported at its inner portions close to the connection blocks 6a and 6b by flat brace bars 14a and 14b. On the middle portion of the flow tube 4 or the counterbalance tube 5 (in the shown case), which is supported by the flat brace bars 14a and 14b, there is disposed a weight 10 for making the both tubes have the same natural frequency. A driving portion 7 for driving the flow tube 4 and the counterbalance tube 5 at a resonance natural frequency and sensors 8 and 9 for sensing a phase difference proportional to a Coriolis force acting on the flow tube 4 are also provided on the counterbalance tube body 5.

Figure 13B:
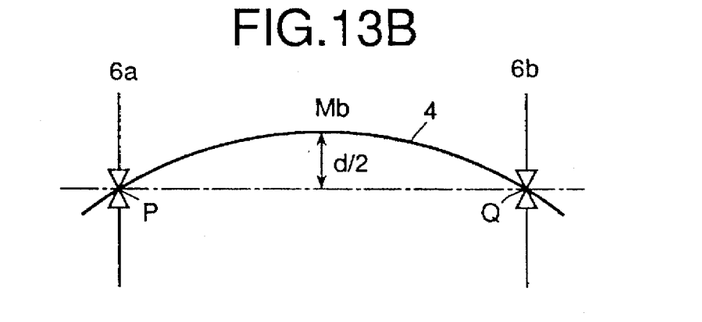
Figure 13C:
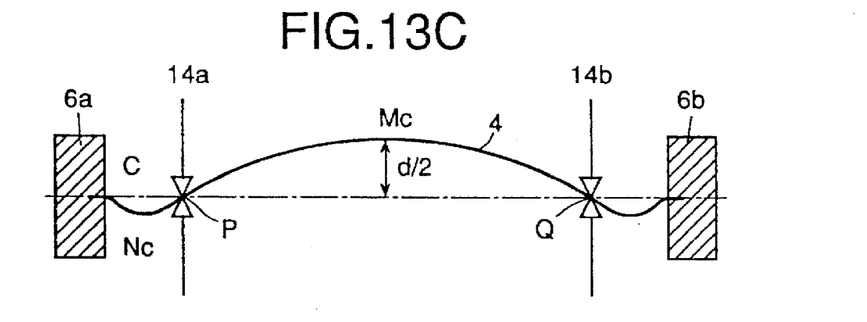

Referring to FIG. 13C, the oscillating operation of the Coriolis flowmeter with flat brace bars 14a and 14b shown in FIGS. 9A and 9B is described as follows:

In usual simple harmonic oscillation, one flow tube 4 supported freely at two separate points P and Q oscillates with a constant amplitude d. In this case, the flow tube 4, being freely supported, vibrates with a curvature Mb as shown in FIG. 13B. The flow tube 4 supported at one point by each of supports P and Q can stably vibrate because it is almost free from the influence of the characteristic change of supporting portions, which may occur in case of the flow tube 4 secured at both ends by the connection blocks 6a and 6b as described with reference to FIG. 13A.

FIG. 13C shows an oscillation mode of a flow tube portion between the brace bars 14a and 14b provided for supporting the double tube portion. Since these brace bars are flat plates supporting the flow tube 4 each at one point, the flow tube 4 between the brace bars 14a and 14b is driven by the driving portion 7 at a resonance frequency of a constant amplitude d and may vibrate with a curvature MC of the simple harmonic oscillation like the flow tube of FIG. 9A. The flow tube 4 between the brace bar 14a (4b) and the connection block 6a (6b) may vibrate with an anti-phase curvature Nc relative to the curvature Mc.

As the distance of a section between P and C is short and the thin plate brace bars 14a and 14b can serve as leaf springs which can turn about supporting points P and Q respectively with resonant oscillation of the flow tube 4 and counterbalance tube 5, the flow tube can be stably supported at points P and Q and, therefore, can be effectively driven with a saved energy.

Figure 13D:
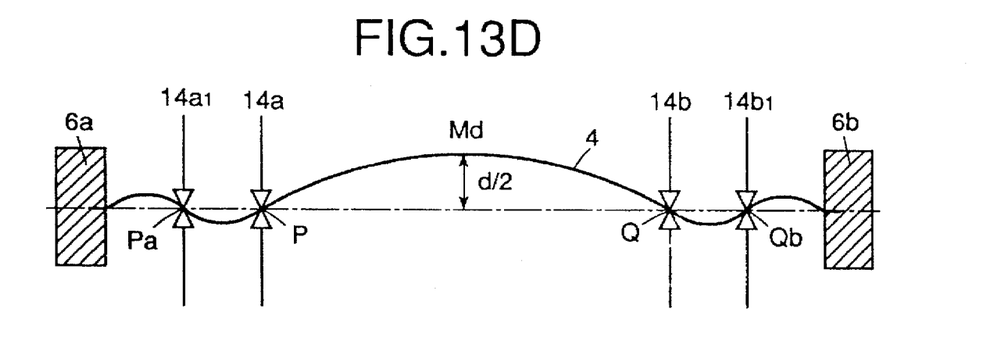

FIG. 13D shows an oscillation mode of a flow tube 4 when a plurality of brace bars ($14a$, $14a_1$, $14b$, $14b_1$) is provided between connection blocks 6a and 6b so that the flow tube 4 (counterbalance tube 5) may be supported at points P, Pa, Q and Qb.

In this case, like the case of FIG. 13D, the flow tube 4 between the inside brace bars 14a and 14b oscillates in a simple harmonic motion mode with a curvature Md, that is, it can be effectively driven with a low driving energy without displacement of supporting points P and Q. The characteristic change of the flow tube due to its fixed ends can be gradually reduced with the number of brace bars used. Hence the flow tube can more stably oscillate between the points P and Q, assuring stable measurements of mass flow.

In the Coriolis flowmeter shown in FIGS. 9A and 9B, the counterbalance 5 is a single tube coaxially disposed on the flow tube 4. However, this counterbalance 5 may be a solid element (not tube) and a plurality of elements (not single element) if its parallelism to the flow tube 4 is assured.

Figure 10A:
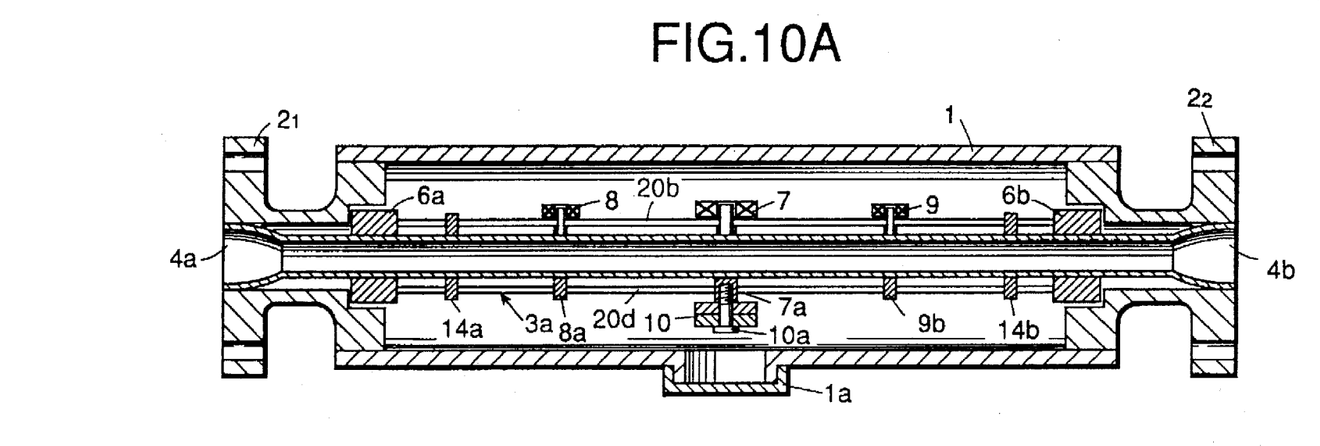
FIG. 10A is a flow-direction sectional view for explaining another embodiment of Coriolis flowmeter according to the present invention.
Figure 10B:
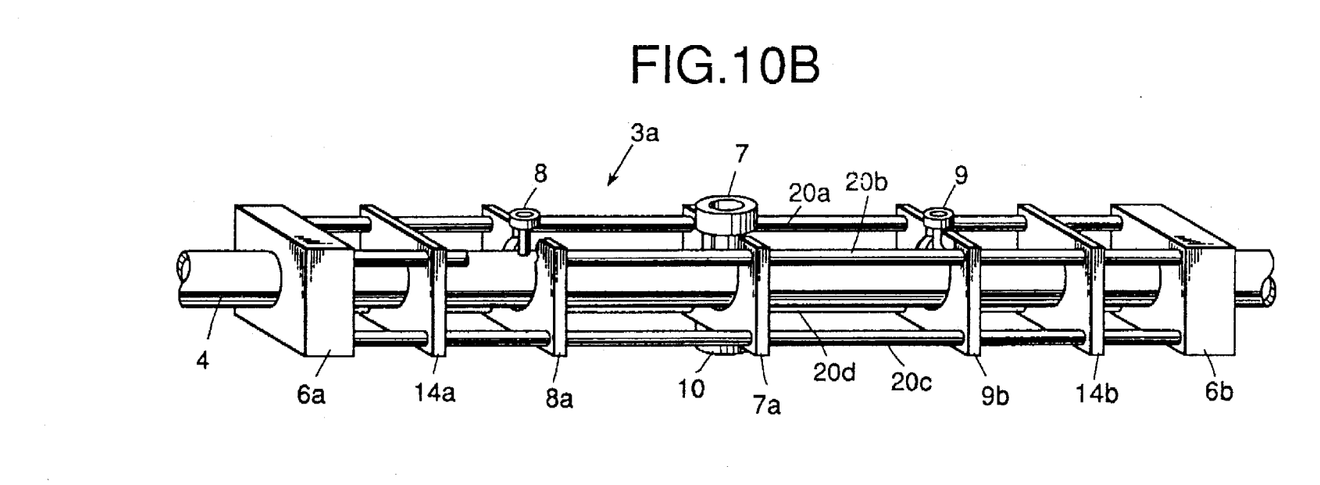
FIG. 10B is a perspective view of an essential portion of the Coriolis flowmeter of FIG. 10A.

FIGS. 10A and 10B are views for explaining another embodiment 7 of a Coriolis flowmeter according to the present invention, which differs from the Coriolis flowmeter of FIGS. 9A and 9B having a straight counterbalance with brace bars 14a, 14b by using a plurality of rod-like counterbalances 20a, 20b, 20c and 20d. The counterbalances 20a, 20b, 20c and 20d are vibrating rod elements made of the same material and the same size to be arranged symmetrically about the axis of the flow tube and be secured each at both ends in common connection blocks 6a and 6b. Between the connection blocks 6a and 6b, the counterbalances are supported in respective through holes made in a drive supporting plate 7a at the center of the flow tube body. 4, sensor supporting plates 8a, 9b disposed symmetrically about the drive supporting plate 7a, a brace bar 14a disposed between the sensor supporting plate 8a and the connection block 6a and a brace bar 14b disposed between the sensor supporting plate 9b and the connection block 6b. The flow tube 4 is supported by the brace bars 14a and 14b secured thereto and freely extends through center holes (with no contact therein) made in the sensor supporting plates 8a, 9b and the drive supporting plate 7a so that the oscillation of the flow tube 4 may not restricted by the above-mentioned supporting plates. A driving device 7 is mounted between the flow tube 4 and the drive supporting plate 7a, a sensor 8 between the flow tube 4 and the sensor supporting plate 8a and a sensor 9 between the flow tube 4 and the sensor supporting plate 9b. The lateral natural frequency of the integrally mounted rod-like counterbalances 20a, 20b, 20c, 20d is selected to be equal to that of the flow tube 4. The natural frequency of the flow tube, however, may vary with a change of the density of fluid to be measured. To equalize the natural frequency of the oscillation system, an adjustable weight 10 is attached to the drive supporting plate 7a for external adjustment of the natural frequency. The number of rod-like counterbalances is not limited to 4 but may be two or more.

Figure 11A:
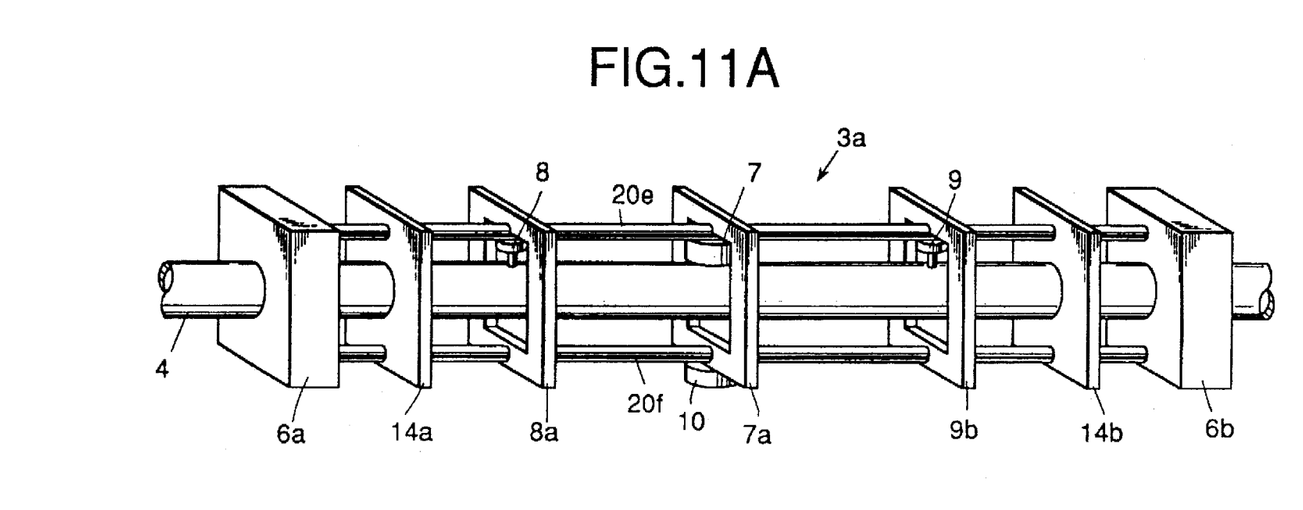
FIGS. 11A and 11B are perspective views for explaining two rod-type counterbalances Coriolis flowmeters according to the present invention.
Figure 11B:
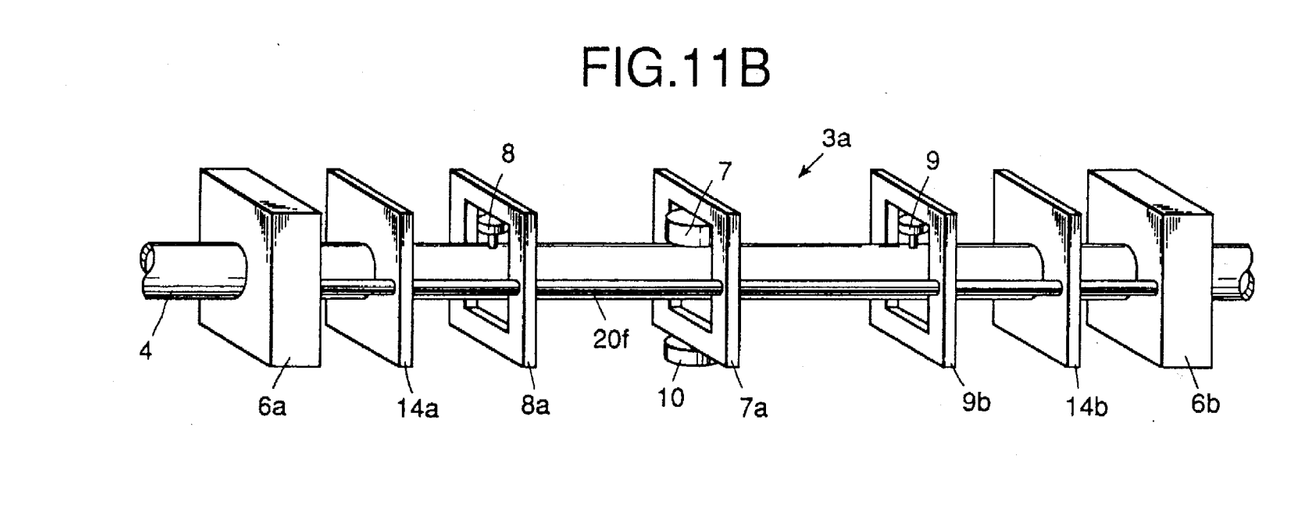

FIGS. 11A and 11B are perspective views for explaining Coriolis flowmeters using two rod-like counterbalances shown in FIGS. 10A and 10B. Both embodiments use rod-like counterbalances 20e and 20f arranged symmetrically about the axis of the flow tube 4 in a plane along the axis thereof but they have different oscillating directions. Namely, the Coriolis flowmeter of FIG. 11A oscillates in the vertical direction in the plane including three axes of the flow tube 4 and two counterbalances 20e and 20f whilst the Coriolis flowmeter of FIG. 11B oscillates in the direction perpendicular to the above-mentioned plane including three axes of the three components. The other components of the Coriolis flowmeters are similar to those of the flowmeters shown in FIGS. 10A and 10B.

Figure 12A:
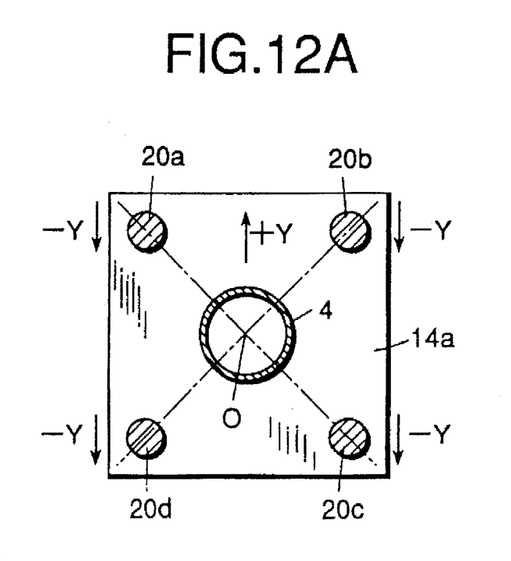
FIGS. 12A, 12B and 12C are perspective views for showing oscillating directions of a plurality of rod-type counterbalances.
Figure 12B:
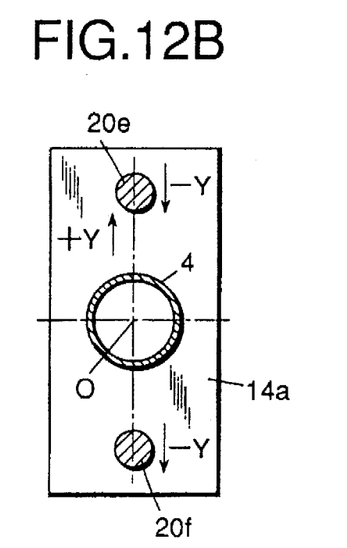
Figure 12C:
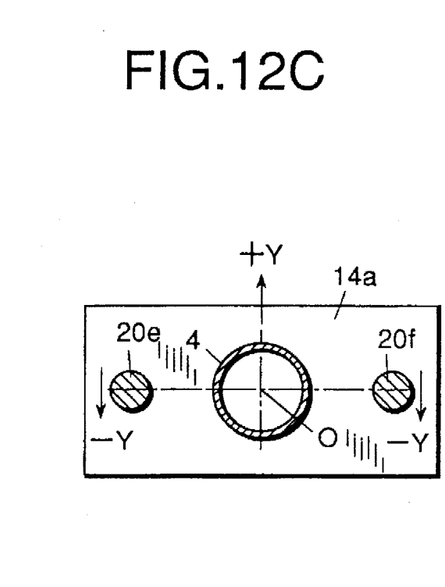

FIGS. 12A, 12B and 12C are views for explaining oscillating directions of a plurality of rod-like counterbalances. FIG. 12A shows oscillation directions of the counterbalances of FIGS. 10A and 10B, FIG. 12B shows oscillation directions of the counterbalances of FIG. 11A and FIG. 12C shows oscillation directions of the counterbalances of FIG. 11B. The shown oscillation directions shall be viewed from the direction orthogonal to the surface of the brace bar 14a of each Coriolis flowmeter. In FIG. 12A, the counterbalances 20a, 20b, 20c and 20d oscillate in a direction −Y with the same amplitude whilst the flow tube 4 oscillates anti-phasely in a direction +Y in reverse to the counterbalances 20a, 20b, 20c and 20d. In FIG. 12B, the counterbalances 20e and 20f oscillate with the same amplitude in the direction −Y whilst the flow tube 4 oscillates in the same plane with the counterbalances 5e and 5f but anti-phasely in the direction +Y. In FIG. 12C, the counterbalances 20e and 20f oscillate with the same amplitude in the direction −Y whilst the flow tube 4 oscillates 90° out of oscillation plane with the counterbalances 20e and 20f and anti-phasely in the direction +Y.

In the oscillatory systems shown FIGS. 13A, 13B and 13C, the counterbalances 20a through 20f are rod-like elements each of which may have reduced mass to be driven resonantly with the flow tube 4. This feature is effective to provide a Coriolis flowmeter in reduced size and to eliminate the dependence of the accuracy of measurement upon the mounting state of the flowmeter. Although the embodiments of FIG. 13A, 13B and 13C use 2 and 4 counterbalances, any number of counterbalances may be used as far as they can be oscillated resonantly with the flow tube.

When the temperature of fluid changes, the Young's modulus of elasticity may change and, therefore, a spring constant K changes, resulting in change of natural frequency $f_1$ of the flow tube 4 (equation 1) and natural frequency $f_2$ of the counterbalance 5 (equation 2). The flow tube 4 immediately responds to get the same temperature as the fluid has, but the counterbalance 5 can slowly change its temperature. As the result of this, the oscillation period of the double tube portion 3 slowly changes and it requires a time to get a stabilized level of oscillation. Therefore, it is impossible to effectively correct the counterbalance 5 for temperature of the fluid because the oscillation period can slowly change.

If a temperature of the measurable fluid changed from $t_1$ to $t_0$ for a time T, a temperature of the flow tube 4 immediately changes from $t_1$ to $t_0$ in response to the fluid temperature $T_0$ and the Young's modulus of the flow tube material changes and the spring constant changes. Consequently, the natural frequency $f_1$ of the flow tube changes according to the equation (1) and the oscillation period is kept at a constant if the temperature is constant. This period is expressed as period A.

If the counterbalance 5 is made of constant elastic material such as Ni span C, the Young's modulus of the counterbalance does not change with a change of temperature, the natural frequency $f_2$ is constant according to the equation (2) and therefore the period can be constant when the fluid temperature changes. This oscillation period is expressed as period B. Accordingly, the oscillation period of the double tube portion 3 consisting of the flow tube 4 and the counterbalance 5 can change depending upon the period A and the period B. As the flow tube 4 can change its temperature in response to the fluid temperature t, the fluid temperature t is detected and an accurate period τ is detected.

Using the counterbalance 5 made of constant elastic material makes it possible to respond without delay a change of the fluid temperature, simply correct the period for the fluid temperature only and accurately determine the fluid density according to the corrected period. Application of the counterbalance 5 made of material having a low linear expansion coefficient such as invar, which can keep a constant length against a change of fluid temperature and a change of surrounding temperature, enables the Coriolis flowmeter to effectively determine mass flow and density of fluid with a high response time according to the same procedure as mentioned above.

We claim:

1. A Coriolis flowmeter comprising a cylindrical outer housing having longitudinal end portions, a connecting member at each of said end portions, a coaxial double tube means disposed within the cylindrical outer housing so as to be radially fixed but axially moveable, said double tube means comprising an inner tube through which fluid flows and an outer counterbalance tube disposed coaxially with said inner tube and secured to said inner tube, driving means for resonantly oscillating the inner tube and the outer counterbalance tube in an oscillating direction at the same frequency with opposite phases, a weight secured to the outer counterbalance tube for making the lateral natural frequency of the outer counterbalance tube equal to the natural frequency of the inner tube, sensing means for sensing a phase difference proportional to a Coriolis force acting on the inner tube, support means supporting said double tube means on said connecting member at oscillating nodes of the double tube means, said support means comprising rectangular leaf springs with the general plane of each rectangular leaf spring being parallel to the oscillating direction of said double tube means, said rectangular leaf springs extending diametrically from said double tube means with the general plane of each rectangular flat leaf spring being perpendicular to the oscillation direction.

2. A Coriolis flowmeter according to claim 1 said rectangular leaf springs each having a length and a width which extends transversely of said length, said leaf spring having a lengthwise axis disposed perpendicular to the oscillating direction of said double tube means.

3. A Coriolis flowmeter according to claim 2 said rectangular leaf springs comprise parallel sides parallel to said lengthwise axis.

4. A Coriolis flowmeter according to claim 2 wherein said lengthwise axis of said rectangular leaf springs pass through the axis of said inner tube.

5. A Coriolis flowmeter according to claim 1 whereby said rectangular leaf springs have enhanced rigidity in the oscillating direction to provide a stable support for the double tube means in said housing while enabling axial movement of the double tube means in an axial direction.

6. A Coriolis flowmeter according to claim 1 said double tube means comprises securing means securing said inner tube to said outer counterbalance tube, said inner tube having tube extensions extending longitudinal beyond said securing means and beyond longitudinal ends of said outer counterbalance tube, each of said tube extensions having a radially expanded end which is secured to said respective connecting member, said radially expanded ends providing enhanced rigidity in a radial direction to provide a stable support for said double tube means on said housing while enabling movement of said inner tube in an axial direction.

7. A Coriolis flowmeter according to claim 6 whereby the mass of said weight secured to the counterbalance tube is adjustable.

8. A Coriolis flowmeter according to claim 6 wherein said radially expanded portions have a bell mouth configuration.

9. A Coriolis flowmeter according to claim 1 wherein said inner tube and said outer counterbalance tube each have longitudinal ends, said rectangular leaf spring being longitudinally spaced inwardly from said longitudinal ends of said inner tube and said outer counterbalance tube.

10. A Coriolis flowmeter according to claim 1 wherein said rectangular leaf springs are disposed between said outer counterbalance tube and said cylindrical outer housing, said rectangular leaf springs comprising two rectangular leaf spring elements extending diametrically from opposite sides of said outer counterbalance tube.

11. A Coriolis flowmeter according to claim 10 wherein said rectangular leaf springs extend diametrically from the longitudinal ends of said outer counterbalance tube.

12. A Coriolis flowmeter according to claim 1 whereby the mass of said weight secured to the outer counterbalance tube is adjustable.

13. A Coriolis flowmeter comprising a cylindrical outer housing having longitudinal end portions, a connecting member at each of said end portions, a coaxial double tube means disposed within the outer housing so as to be radially fixed but axially moveable, said double tube means comprising an inner tube through which fluid flows and an outer counterbalance tube disposed coaxially with said inner tube and secured to said inner tube, driving means for resonantly oscillating the inner tube and the outer counterbalance tube in an oscillating direction at the same frequency with opposite phases, a weight secured to the outer counterbalance tube for making the lateral natural frequency of the outer counterbalance tube equal to the natural frequency of the inner tube, sensing means for sensing a phase difference proportional to a Coriolis force acting on the inner tube, support means supporting said double tube means at oscillating nodes of the double tube means, said support means comprising leaf springs disposed in a plane perpendicular to the axis of said double tube means, said leaf springs, when viewed from the longitudinal end of the double tube means, extending in a diametrical direction on diametrically opposite sides of said double tube means, said diametrical direction being perpendicular to said oscillating direction, whereby said leaf springs have enhanced rigidity in the oscillating direction to provide a stable support for the double tube means in said housing while enabling axial movement of the double tube means in an axial direction.

14. A Coriolis flowmeter according to claim 13 wherein said leaf springs each having a length and a width which extends transversely of said length, said leaf springs having a lengthwise axis disposed perpendicular to the oscillating direction of said double tube means.

15. A Coriolis flowmeter according to claim 14 wherein said leaf springs comprise parallel sides parallel to said lengthwise axis.

16. A Coriolis flowmeter according to claim 14 wherein said lengthwise axis of said rectangular leaf springs pass through the axis of said inner tube.

17. A Coriolis flowmeter according to claim 13 said double tube means comprising securing means securing said inner tube to said outer counterbalance tube, said inner tube having tube extensions extending longitudinal beyond said securing means and longitudinally beyond longitudinal ends of said outer counterbalance tube, each of said tube extensions having a radially expanded end which is secured to said respective connecting member, said radially expanded ends providing enhanced rigidity in a radial direction to provide a stable support for said double tube means on said housing while enabling movement of said inner tube in an axial direction.

18. A Coriolis flowmeter according to claim 13 wherein said inner tube and outer counterbalance tube each have longitudinal ends, said leaf springs being longitudinally spaced inwardly from the longitudinal ends of said inner tube and outer counterbalance tube.

19. A Coriolis flowmeter according to claim 13 wherein said leaf springs are disposed between said outer counterbalance tube and said cylindrical outer housing, said leaf springs comprising two leaf spring elements extending from diametrically opposite sides of said outer counterbalance tube.

20. A Coriolis flowmeter comprising a cylindrical outer housing having longitudinal end portions, a connecting member at each of said end portions, a coaxial double tube means disposed within the outer housing so as to be radially fixed but axially moveable, said double tube means comprising an inner tube through which fluid flows and an outer counterbalance tube disposed coaxially with said inner tube, securing means securing said inner tube to said outer counterbalance tube, driving means for resonantly oscillating the inner tube and the outer counterbalance tube in an oscillating direction at the same frequency with opposite phases, a weight secured to the outer counterbalance tube for making the lateral natural frequency of the outer counterbalance tube equal to the natural frequency of the inner tube, sensing means for sensing a phase difference proportional to a Coriolis force acting on the inner tube, said inner tube having tube extensions extending longitudinal beyond said securing means and longitudinally beyond the longitudinal ends of said outer counterbalance tube, each of said tube extensions having a radially expanded end which is secured to said respective connecting member, said radially expanded ends providing enhanced rigidity in a radial direction to provide a stable support for said double tube means on said housing while enabling movement of said inner tube in an axial direction.

21. A Coriolis flowmeter according to claim 20 wherein said radially expanded portions has a bell mouth configuration.

22. A Coriolis flowmeter according to claim 20 whereby the mass of said weight secured to the outer counterbalance tube is adjustable.

* * * * *